United States Patent [19]
Paranjpe et al.

[11] 4,112,469
[45] Sep. 5, 1978

[54] JET DROP COPYING APPARATUS

[75] Inventors: Suresh C. Paranjpe; James E. Burnett, both of Xenia, Ohio

[73] Assignee: The Mead Corporation, Dayton, Ohio

[21] Appl. No.: 789,417

[22] Filed: Apr. 21, 1977

[51] Int. Cl.² .................... H04N 1/04; H04N 1/22
[52] U.S. Cl. .................... 358/296; 358/293; 346/75; 346/138; 400/126
[58] Field of Search ........... 358/296, 289, 293, 285, 358/75, 286; 346/75, 138; 250/570; 197/1 R

[56] References Cited

U.S. PATENT DOCUMENTS

| | | | |
|---|---|---|---|
| 1,817,098 | 8/1931 | Ranger | 358/75 |
| 2,413,965 | 1/1947 | Goldsmith | 235/92 |
| 2,881,247 | 4/1959 | Levine | 358/293 |
| 3,501,643 | 3/1970 | Kawaguti | 250/219 |
| 3,629,593 | 12/1971 | Van Brimer | 250/570 |
| 3,689,693 | 9/1972 | Cahill | 346/75 |
| 3,752,558 | 8/1973 | Lloyd | 358/293 |
| 3,988,062 | 10/1976 | Burton | 355/23 |
| 4,009,332 | 2/1977 | Van Hook | 346/75 |

FOREIGN PATENT DOCUMENTS 56,134  5/1976  Japan .................... 358/296

OTHER PUBLICATIONS

"Ink Jet Nozzles in a Ring Array", by G. D. Bruce, IBM Tech. Disc. Bul., vol. 18, No. 12, May 1976, pp. 3917-3918.
"Ink Jet Copier Nozzle Array", by R. L Fowler, IBM Tech. Disc. Bull., vol. 16, No. 4, Sep. 1973, pp. 1251-1253.
"Ink Jet Copier", by Bullock et al., IBM Tech. Disc. Bull., vol. 16, No. 4, Sep. 1973, pp. 1254-1255.

*Primary Examiner*—Bernard Konick
*Assistant Examiner*—Alan Faber
*Attorney, Agent, or Firm*—Biebel, French & Nauman

[57] ABSTRACT

A jet drop copying apparatus has an array of printing nozzles supported for axial movement over a copy paper mounted upon a rotating drum. Simultaneously therewith an optical scanning system scans a document positioned flat on a planar support surface and sweeps an image thereof across an array of photosensors arranged in correspondence with the array of printing nozzles. Output signals from the photosensors are supplied to a control unit which controls the printing operation of the nozzles.

The control unit also controls the optical scanning for synchronism with the movement of the nozzle array relative to the copy paper. The nozzles are rather widely spaced, but their spacing (and likewise the photosensor spacing) is adjusted in accordance with the number thereof and with the nozzle movement speed so as to produce an interlaced solid printed copy. Optical distortion during scanning is avoided by provision of a double lens arrangement with a rotating mirror therebetween.

9 Claims, 6 Drawing Figures

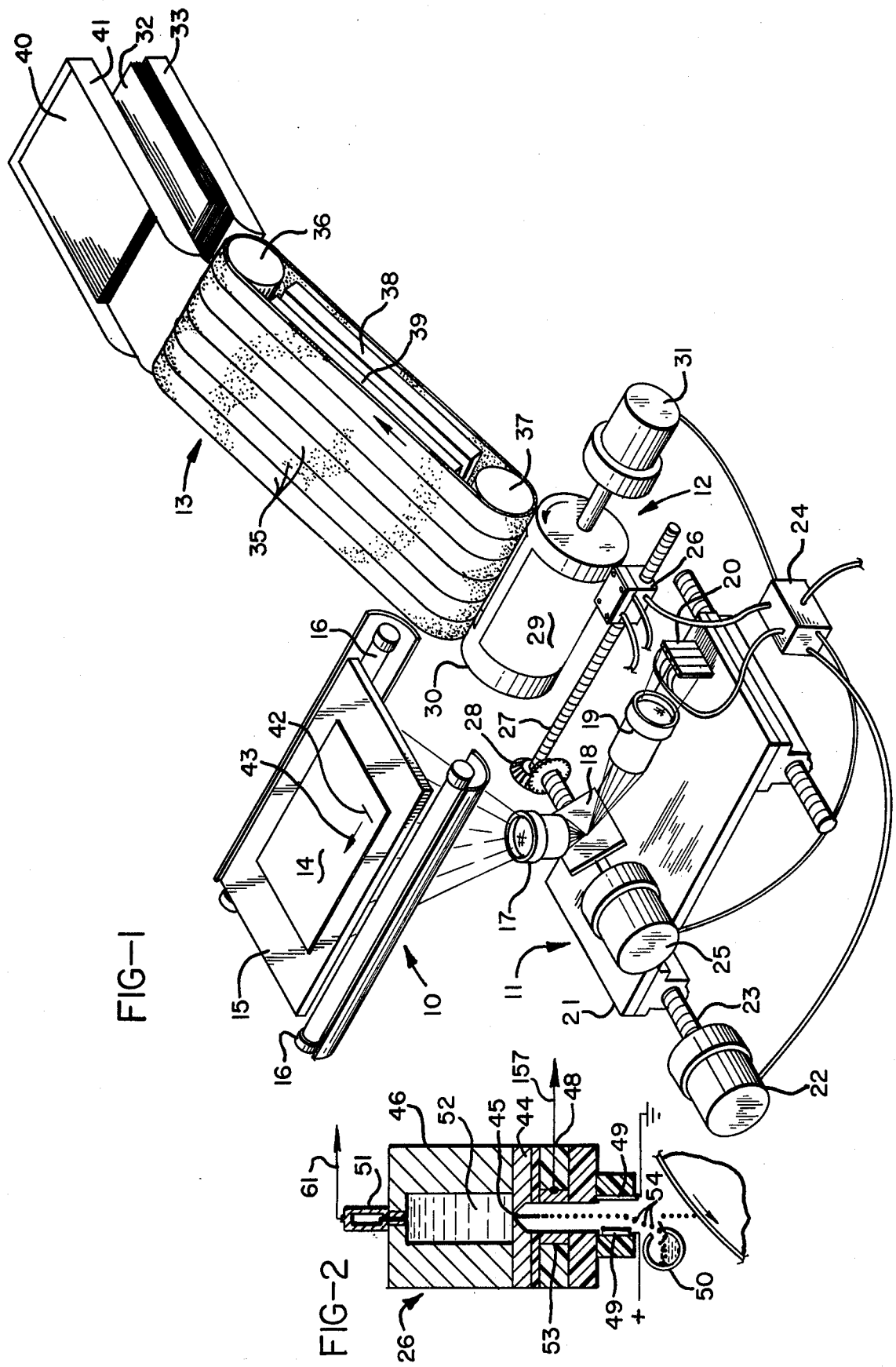

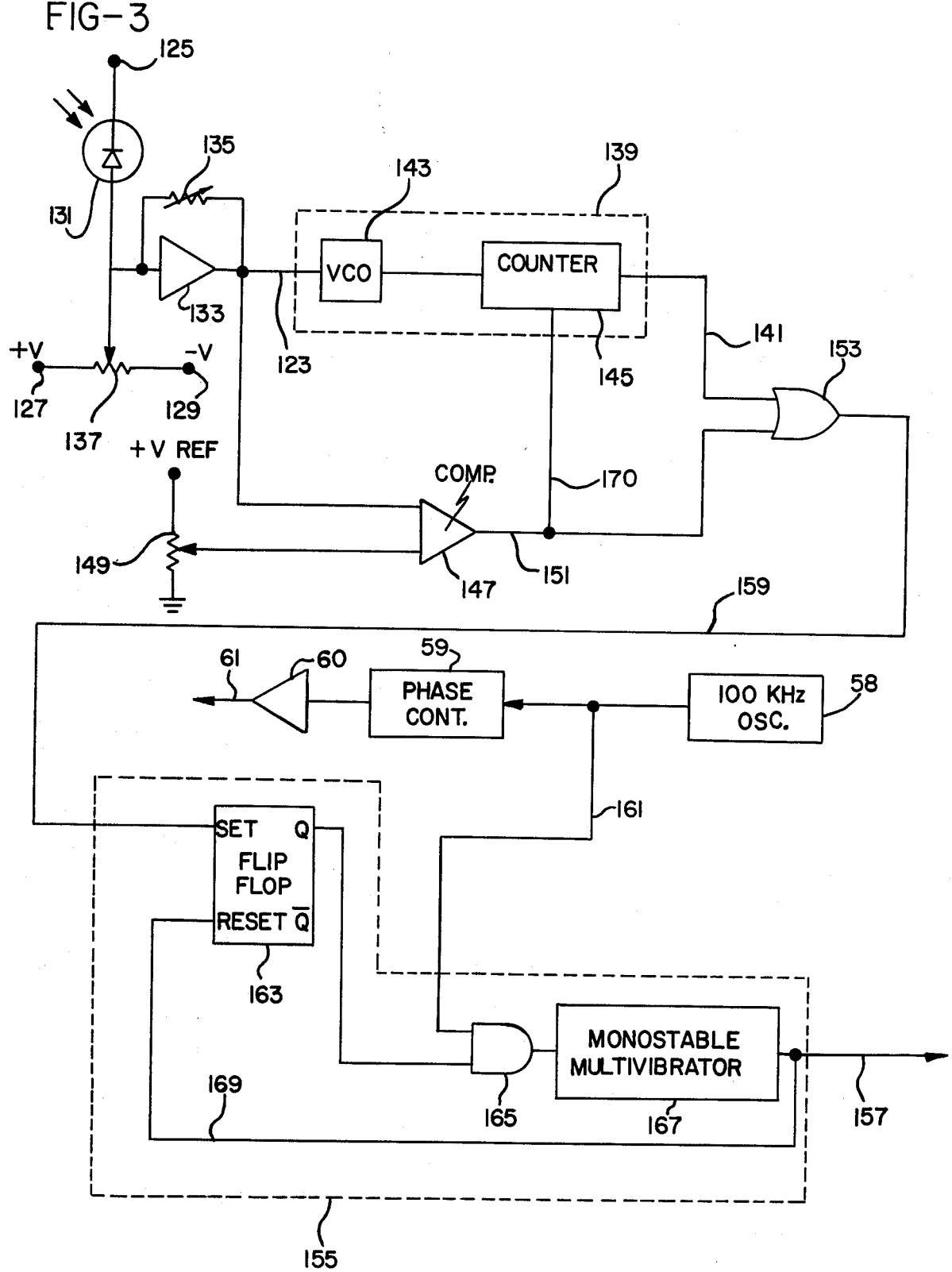

JET DROP COPYING APPARATUS

BACKGROUND OF THE INVENTION

This invention relates to copying and duplicating devices and more particularly to such devices wherein recording is accomplished by means of a non-contact jet drop print head. A number of such devices are shown in the prior art as disclosed, for instance in Ranger et al U.S. Pat. No. 1,817,098, Behane et al U.S. Pat. No. 3,604,846 and Loughren U.S. Pat. No. RE27,555. Each of these supports a copy sheet on a rotating drum, across which a jet drop print head is translated. A somewhat different arrangement is disclosed in Taylor U.S. Pat. No. 3,564,120 wherein a plurality of jet drop print heads are scanned in rotary arcs over a print receiving paper being transported in a horizontal plane. These prior art devices are configured in such a manner as to be generally adapted for use in an office copying or duplicating environment, but they are all considered to be too slow for most office copying applications.

A faster copier is taught in Cahill et al U.S. Pat. No. 3,689,693 wherein a plurality of print heads, typically eight, cooperatively print stripes collectively representing an original to be reproduced. This reduces the printing time significantly, but the system is somewhat limited by the fact that it has only one printing nozzle per head. An even faster printing employs multiple nozzle heads which print interlaced helical tracks as taught in Van Hook U.S. Pat. No. 4,009,332. Finally of general background interest for their showing of other different types of jet drop copiers are Hertz U.S. Pat. No. 3,416,153, Suenaga U.S. Pat. No. 3,553,371, Wick et al U.S. Pat. No. 3,828,355 and Fishbeck U.S. Pat. No. 3,925,790.

SUMMARY OF THE INVENTION

According to the present invention there is provided a copier having a jet drop print head of a type wherein a plurality of nozzles print non-adjacent tracks on a print receiving member mounted upon a rotating surface. The spacing of the nozzles, measured in line widths, is such that it has no integer other than one as a factor in common with the number of nozzles. During rotation of the support surface the print head is translated axially therealong at a speed such that during one drum rotation the head is translated a distance measured in line widths which is equal in number to the total number of nozzles. This produces an interlaced print with each line being printed by one and only one nozzle. The nozzles may be arranged in more than one row, if desired.

Further in accordance with the present invention the copier is provided with a flat document support surface and an improved optical scanning arrangement which sweeps an image of the document across an array of photosensors arranged in correspondence with the above described nozzle arrangement. Optical distortion during scanning is avoided by collimating the light reflected from the document and directing the collimated light against a rotating mirror assembly. A copier which is so constructed is able to scan and copy a 20 by 25 cm image at a resolution of 10 lines per mm in a time less than one second.

It is therefore an object of this invention to provide an improved jet drop copying and duplicating machine.

It is another object of this invention to increase the printing speed of office type jet drop recorders.

Other objects and advantages of the invention will be apparent from the following description, the accompanying drawings and the appended claims.

BRIEF DESCRIPTION OF THE DRAWINGS

FIG. 1 is a schematic illustration of a copying system which operates in accordance with this invention.

FIG. 2 is a cross-sectional drawing of a jet drop print head.

FIG. 3 is a schematic drawing of electrical circuitry for controlling the switching of one jet.

DESCRIPTION OF THE PREFERRED EMBODIMENT

Figure 4:
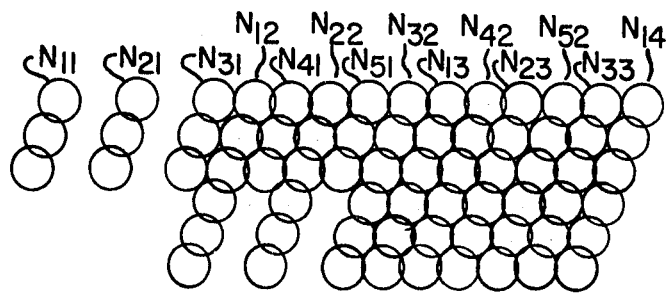
FIG. 4 illustrates a printing pattern for an arrangement of five nozzles having a nozzle spacing equal to the width of two printing lines.

As generally illustrated in FIG. 1 a copier operating in accordance with this invention may comprise a document illumination station 10, a scanning system 11, a printing system 12, and a paper transport system 13. In order to produce one or more copies an original document 14 is placed flat on a planar support glass 15. A suitable control switch activates a pair of lamps 16 to illuminate document 14 for imaging by a scanning lens 17.

The image scanned by lens 17 is reflected from the surface of a rotating mirror 18 into a focusing lens 19 for imaging upon a photodiode array 20 positioned at the image plane of focusing lens 19. It will be seen that the light rays upon emergence from lens 17 are collimated, so that distortion free scanning is obtained. A line of individual photodiodes in the array 20 are spaced to observe spaced points along a line such as line 42. The rotation of mirror 18 causes the line of observed points to move in a direction as indicated by the arrow 43. For the preferred embodiment as hereinafter described, there may be 59 individual photodiodes spaced to observe 59 points along the line 42. These 59 points of observation may each have a diameter of 0.1 mm, and they may be spaced apart by a distance of 0.5 mm.

The scanning system is supported by a Table 21 which rides on a worm 23. Worm 23 is driven by a synchronous drive motor 22 under control of a control unit 24. For the embodiment herein described worm 23 has its pitch adjusted such that one revolution of motor 22 advances Table 21 5.9 mils axially along the worm. Motor 22 may turn at a speed of 33⅓ revolutions per second, so that in a space of 0.93 seconds the worm has been rotated 31 revolutions and has advanced the scanning assembly a distance of 18.29 cm. This advance enables copying of an original document 20 cm wide.

While drive motor 22 is axially advancing Table 21, drive motor 25 rotates mirror 18, also at a speed of 33⅓ revolutions per second. This causes repeated scanning of the observation line 42 along the length of document 14 synchronously with the above described widthwise scanning. Drive motor 25 also operates under control of control unit 24, which includes a 100 kHz crystal controlled oscillator. A counter divides the 100 kHz signal by 3,000 in order to obtain driving control signals for drive motors 22 and 25. The 100 kHz oscillator output also controls jet stimulation and switching as hereinafter described.

Printing system 12 comprises a print head 26 and a drum 30. Drum 30 is connected to an air line (not illustrated) and has a perforated surface for vacuum mounting of a print sheet 29. Drum 30 is rotated by a drive motor 31 under control of control unit 24 and in synchronism with the rotation of mirror 18.

As further illustrated in FIG. 1, print head 26 is mounted for common driving with table 21. Thus the print head rides along a worm 27, which is driven by worm 23 as by a bevel gear 28. Worm 27 has the same pitch as worm 23, so that print head 26 scans print sheet 29 in exact correspondence with the scanning of document 14 by photodiode array 20.

Alternatively, worm 27 may be driven by its own drive motor under direct control of control unit 24. A clutch (not illustrated) allows both forward and reverse driving of the worms, and copying can proceed in either direction.

Figure 6:
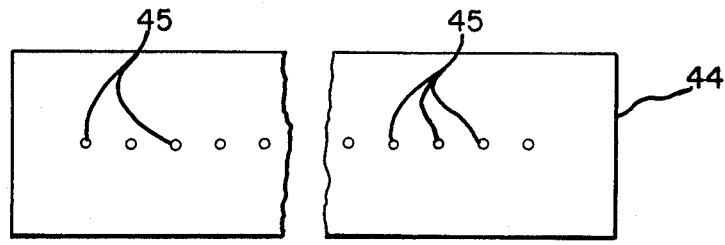
FIG. 6 is a plan view of an orifice plate.

Print head 26 is preferably of laminar construction as generally taught by Beam et al U.S. Pat. No. 3,586,907 and produces an array of longitudinally spaced jets. If desired, the print head may produce an array of jets arranged in two parallel rows as taught by Mathis U.S. Pat. No. 3,701,998, in which case the photodiode array 20 must be similarly arranged. Alternatively, print head 26 may produce an array of jets arranged in a single straight line and for this purpose may incorporate an orifice plate 44 having 59 orifices 45 positioned as shown in FIG. 6. Typically each orifice will have a diameter of about 0.04 mm, and the orifices are spaced on 0.5 mm centers.

Additional details of print head 26 are shown in FIG. 2, wherein it is seen that primary elements are a fluid supply manifold 46, the orifice plate 44, a charge ring plate 48, deflection electrodes 49, and a catcher 50. The manifold 46 contains a supply of printing ink 52, which flows under pressure through orifices 45 to form a row of streams.

Stimulator 51, driven by a 100 kHz driving signal on line 61, stimulates the aforementioned streams to break up into trains of drops 54. The drops are selectively charged by a series of charge rings 53, which are in registration with orifices 45. Those drops which are charged are deflected by deflection electrodes 49 into the catcher 50, while the uncharged drops proceed to deposit upon the printing sheet 29. Drop charging and deflection are carried out as taught by the above mentioned Beam et al and Mathis patents, with drop charging being under control of photodiode output signals as hereinafter described. Drop stimulation must be effected in such a manner that all drops in all streams are generated at the same phase. For this purpose there may be employed a stimulation arrangement as taught by Titus et al U.S. Pat. No. 3,900,162, it being understood that the arrangement of FIG. 2 is a schematic illustration only.

Returning again to FIG. 1, it will be seen that print sheet 29 is transported to drum 30 from a paper supply stack 32 in a supply tray 33. A paper feed arrangement (not illustrated) feeds the print sheets to a series of belts 35, which travel continuously about a pair of rolls 36 and 37.

Belts 35 transport the sheets 29 by vacuum forces between their adjoining edges. For this purpose there are provided a lower plenum 38 and an upper plenum 39, both of which are connected to vacuum sources (not illustrated). Rollers 36 and 37 are also connected to air supplies (not illustrated) capable of controllably applying either pressure or vacuum to the interiors of the drums. The drums have segmented slits in alignment with the edges of belts 35, so that a sheet 29 being transported therepast can be gripped against the belts 35 or separated therefrom.

A pneumatic system (not illustrated) selectively controls the application of either pressure or vacuum to drums 30, 36 and 37. The pneumatic system is actuated by paper sensors near drums 36 and 37 and by a trip switch activated by contact with print head 26.

At commencement of printing a vacuum is applied to drums 30 and 36, and pressure is applied to drum 37. Thus when the paper feed mechanism feeds a print sheet 29 to belts 35 in the region of drum 36, the sheet is picked up by the belts and transported to drum 37. A set of paper guides (not illustrated) transfer the sheet from drum 37 to drum 30 for commencement of printing.

When the print sheet 29 has been completely printed print head 26 activates the aforementioned trip switch, which in turn enables operation of a paper sensor located adjacent drum 30. The paper sensor senses paper 29, and after an appropriate time delay, causes the pneumatic control system to apply a pressure to the interior of drum 30 and a vacuum to the interior drum 37. This transfers paper 29 from drum 30 to belts 35. The printed sheet then travels along belts 35 to receiving tray 41. Upon approach to receiving tray 41 a paper sensor causes activation of the pneumatic system to apply pressure to the interior of drum 36. This separates the sheet 29 from belts 35, and a set of paper guides (not illustrated) transfers the sheet to the printed stack 40. It will be understood that a suitable dryer may be positioned adjacent roll 30 as required by the drying characteristics of the ink and paper employed and the copy rate.

Reference is now made to FIG. 3, in which is shown optical encoding means for encoding the tone of document 14 along a scan line and producing a pulse train output signal for printing control. Photodiode array 20 includes a series of photodiodes 131, one of which is illustrated in FIG. 3 and causes a signal level on the line 123 dependent upon the light level being observed. Operational amplifier 133 and variable resistor 135 form an amplifier means for providing the signal on line 123 in dependence upon the reverse current passing through diode 131, and the amplitude of this reverse current in turn depends upon the level of the light striking the photodiode. Reference voltages for operation of photodiode 131 are applied as illustrated to terminals 125, 127, and 129.

The resistor 135 is adjusted to control the gain of the amplifier, and this adjustment is made such that the printer will print a faint gray tone even when the diode 131 is fully illuminated. An integrator means 139 is responsive to the analog output on line 123 for repetitively integrating the output of the scanner and providing a first enabling signal on line 141 when the integral reaches a predetermined level. The integrator means 139 includes a variable oscillator 143 and a counter 145. The voltage controlled oscillator 143 provides an output signal of a frequency which is dependent on the output of the photosensitive means and the counter 145 is responsive to the output of the oscillator. Counter 145 is a divide-by-N counter which provides an output pulse on line 141 after every N cycles of the oscillator output.

A level detector means includes a comparator 147 and a potentiometer 149 which provides a reference voltage. The comparator provides a second enabling signal on line 151 when the output 123 exceeds a predetermined level set by potentiometer 149. Comparator 147 also provides a signal on line 170 for resetting counter 145.

Printing control signals are generated by charging control means 155 under the control of output signals from OR gate 153. The printing control signals take the form of pulse trains on output line 157, and these pulse trains are generated upon occurrence of either of the above mentioned first or second enabling signals. Line 157 is connected to charge ring 53 (FIG. 2). Each pulse on line 157 therefore charges charge ring 53 and causes a drop of ink 54 to be charged and deflected into catcher 50.

FIG. 3 also illustrates a 100 kHz oscillator 58 which provides timing control for drop charging and stimulation as well as for operation of drive motors 22, 25 and 31. For timing control of drop charging, 100 kHz output pulses from oscillator 58 are applied to line 161, which in turn is connected to charging control means 155. This same signal is applied to a phase control unit 59, and phase control unit 59 drives an amplifier 60. The output from amplifier 60 produces stimulation control signals on line 61 for application to stimulator 51 (FIG. 2).

Phase control unit 59 adjusts the amplitude of the stimulation signals so as to synchronize drop generation with drop charging. Such phase control involves application of a calibrating signal to all charging electrodes 53 during recording dead times when the print head is facing the back of the drum. An electrometer, not shown, measures the current carried away by catcher 50 during these times, and that measurement controls the amplitude of the stimulation signals as taught in Robertson U.S. Pat. No. 3,761,941.

Charging control means 155 includes a flip-flop 163 which is set by a pulse on line 159. The Q output of flip-flop 163 is applied to AND gate 165 together with timing pulses from line 161. The output of AND gate 165, in turn, is applied to the monostable multivibrator 167 which, in turn, provides the control output signal to the ink jet printer of the copier. The output of multivibrator 167 is also applied via line 169 to the reset input of flip-flop 163. When a pulse is received on line 159, flip-flop 163 is set and its Q output goes high. This enables AND gate 165 such that the next timing pulse on line 161 is passed by gate 165 to multivibrator 167. The output of multivibrator 167 then resets flip-flop 163, thus enabling charging control means 55 to provide a further output.

Figure 5:
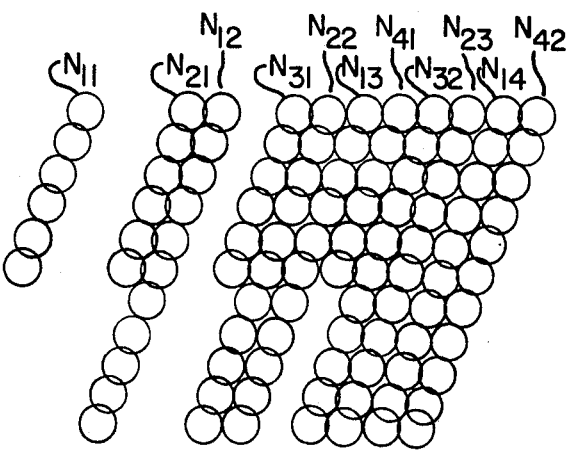
FIG. 5 illustrates the printing pattern for an arrangement of four nozzles having a nozzle spacing equal to the width of three printing lines.

The interlaced printing technique which is practiced by the copier is illustrated in FIGS. 4 and 5. This technique produces solid printing coverage only if the nozzle spacing is properly adjusted in accordance with the total number of nozzles, with the print head being advanced axially the correct distance for each rotation of the printing drum.

Looking particularly at FIG. 4 there is illustrated a print such as might be made by an array of five nozzles arranged in a straight line with a nozzle spacing equal to two printing line widths and with a print head axial advance revolution. The illustration of the figure represents printed dots as they might appear on a paper after it has been unwrapped from a printing drum. The printed dots are arranged in lines which are identified by letters carrying a double subscript notation. Thus the letter $N_{11}$ represents the line of printed dots made by nozzle No. 1 during the first revolution of the drum. $N_{21}$ represents the line of printed dots made by nozzle No. 2 during the first revolution of the drum. Similarly $N_{12}$ represents the line of printed dots made by nozzle No. 1 during the second revolution of the drum and so forth.

Due to the spacing between nozzles No. 1 and No. 2 there is an unprinted region between line $N_{11}$ and line $N_{21}$. This space is never printed. Initially there is also an unprinted region between line $N_{31}$ and line $N_{41}$. However, this region is printed by nozzle No. 1 during the second revolution of the drum as illustrated by line $N_{12}$. The first signal track for copying purposes is line $N_{32}$, which is printed by nozzle No. 3 on the second revolution of the drum. After this there is solid printing of all lines so that a five nozzle arrangement of this configuration could commence printing immediately if the corresponding diode array were initially aligned with diode No. 3 observing the left hand margin of the document to be copied.

Table I presents the various nozzle spacings which may be utilized with any number of two through nine nozzles. The X's represent the combinations which will work, it being understood in each case that for each revolution of the drum the print head advances a distance equal to the total number of nozzles multiplied by the width of one printed line. For example, the line width for a system having a resolution of ten lines per mm is 0.1 mm, so a five nozzle arrangement would have an advance of 0.5 mm. The nozzle spacing as set forth in the Table is understood to be in units of line widths.

TABLE I

| Nozzles | Nozzle Spacing | | | | | | | | | | |
|---|---|---|---|---|---|---|---|---|---|---|---|
| | 2 | 3 | 4 | 5 | 6 | 7 | 8 | 9 | 10 | 11 | 12 |
| 2 | | X | | X | | X | | X | | X | |
| 3 | X | | X | X | | X | X | | X | X | |
| 4 | | X | | X | | X | | X | | X | |
| 5 | X | X | X | | X | X | X | X | | X | X |
| 6 | | | | X | | X | | | | X | |
| 7 | X | X | X | X | X | | X | X | X | X | X |
| 8 | | X | | X | | X | | X | | X | |
| 9 | X | | X | X | | X | X | | X | X | |

An analysis of Table I will show that the nozzle spacings which may be employed are in all cases those spacings which have no integer other than 1 as a factor in common with the number of nozzles. Thus five nozzles at a spacing of two line widths can be utilized as verified by Table 1 and FIG. 4.

For comparison purposes FIG. 5 illustrates a print made by a row of four nozzles spaced apart at a distance of three line widths. Table I indicates that this should work, and FIG. 5 verifies that fact. The printed tracks or lines in FIG. 5 are again identified by a double subscript notation as in FIG. 4. Combinations not indicated by an X in Table I will exhibit periodic unprinted or overprinted tracks.

If document copying is to be accomplished with a resolution of ten lines per mm, this implies that each printed line has a width of 0.1 mm. It also implies that a jet drop print head arranged for printing as illustrated in FIG. 1 must have nozzles arranged on 0.1 mm centers. Experience has shown that this orifice spacing is impractically close, and that a more practical spacing is about 0.5 mm. Thus for high resolution printing at a practical nozzle spacing, a nozzle spacing of about five line widths is preferred. Table I indicates that this can be accomplished with two, three, four, six, seven, eight or nine nozzles. A nine nozzle array can print nine times faster than a single nozzle, but for high speed printing more nozzles are desirable. Thus the preferred embodiment as previously described has fifty-nine nozzles spaced five line widths apart. It will be observed that the numbers fifty-nine and five have no integer other than 1 as a common factor.

Table II summarizes some of the print lines which are printed by different nozzles of the fifty-nine nozzle array. This table has been constructed by application of the formula $$N = \frac{L - 1 - A(R - 1)}{S} + 1$$

where: $A$ = nozzle advance per drum revolution (fifty-nine lines in this case), $N$ = nozzle number, $L$ = line number (line No. 1 initially being under nozzle No. 1), $R$ = revolution number, and $S$ = nozzle spacing (in this case five lines).

TABLE II

| Print Line | Nozzle | Revolution |
|---|---|---|
| 1 | 1 | 1 |
| 2 | — | — |
| 3 | — | — |
| 4 | — | — |
| 5 | — | — |
| 6 | 2 | 1 |
| 7 | — | — |
| 8 | — | — |
| 9 | — | — |
| 10 | — | — |
| 11 | 3 | 1 |
| 231 | 47 | 1 |
| 232 | — | — |
| 233 | 12 | 4 |
| 234 | 24 | 3 |
| 235 | 36 | 2 |
| 236 | 48 | 1 |
| 237 | 1 | 5 |
| 238 | 13 | 4 |
| 239 | 25 | 3 |
| 240 | 37 | 2 |
| 289 | 35 | 3 |
| 290 | 47 | 2 |
| 291 | 59 | 1 |
| 292 | 12 | 5 |
| 293 | 24 | 4 |
| 294 | 36 | 3 |
| 295 | 48 | 2 |
| 296 | 1 | 6 |
| 297 | 13 | 5 |
| 298 | 25 | 4 |

Table II indicates that the fifty-nine nozzle array begins solid printing at print line 233 on the fourth revolution of nozzle 12. If line 233 is at the left hand margin of a document 20 cm wide, then the right hand margin will be at line number 2,233. Application of the above formula will show that line No. 2,233 is printed by nozzle No. 58 on revolution No. 34. If the system is set up to begin printing at the margin with nozzle No. 12, then the first three revolutions need not be made. Accordingly, a print 20 cm wide can be made with 31 revolutions of drum 30. As stated above this requires an elapsed printing time of 0.93 seconds for a revolution speed of 33⅓ revolutions per second. During each revolution each nozzle will print a track which is approximately 25 cm long and which contains 2,500 printed dots. Drum 30 conveniently may have a circumference of 30 cm, so that there is 5 milliseconds of wasted time during each printing revolution.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. Jet drop printing apparatus for copying or duplicating comprising:

Rotary support means for supporting a print receiving sheet,

Paper handling means for feeding said sheet to the rotary support means and removing the sheet therefrom, Rotary drive means for causing rotary motion of the rotary support means, A print head including an orifice plate provided with a series of orifices defining an array of jet printing nozzles for generating an array of parallel jets to print a series of non-contiguous tracks of image information on a sheet mounted as aforesaid on the rotary support means and rotated therewith, Advancing means for advancing said array of jets in a direction parallel to the axis of said rotary motion and at a speed for interlacing said tracks to produce a solid coverage print, Flat bed document support means for supporting a document to be copied, Illuminating means for illuminating said document, Collimating means for collimating light reflected by said document, A rotating mirror assembly for variable angular deflection of said collimated light in correspondence with the rotation of the rotary support means, A focusing lens for focusing said collimated and angularly deflected light to create an image of at least a part of said document, An array of photosensing elements arranged in like manner as said jet printing nozzles and positioned at the image plane of the focusing lens, Transport means for transporting said photosensing elements, said focusing lens, said mirror assembly, and said collimating means in a direction parallel to the axis of rotation of the mirror assembly and in synchronism with aforesaid axial advancing of said nozzle array, Print control means responsive to the photosensing elements for controlling the operation of said nozzles, and Means for initiating removal of the print receiving sheet from the rotary support means by the paper handling means.

2. Apparatus according to claim 1 wherein said nozzles are spaced apart a distance equal to an integral number of widths of one of said tracks, which said number has no factor other than one as a common factor with the number of nozzles.

3. Apparatus according to claim 2 wherein said nozzles are supplied with printing liquid from a common manifold.

4. Apparatus according to claim 3 wherein the frequency of repetitive movement of said sheet past said nozzles is so related to the speed of said axial advance that successive sets of printed tracks are shifted by a distance equal to the width of one of said tracks multiplied by a number equal to the number of said nozzles.

5. Apparatus according to claim 4 wherein said nozzles are arranged along a straight line extending in the longitudinal direction.

6. Apparatus according to claim 4 wherein said print head comprises an orifice plate having an array of orifices defining said nozzles, a pressurized supply manifold for delivering a continuous flow of printing liquid through said nozzles, stimulation means for stimulating said printing liquid to break up into drops after passage through said nozzles, a charging plate having an array of charging electrodes in registration with said nozzles and connected to said print control means for charging said drops selectively in accordance with output signals from said photosensing elements, deflection field generating means for deflecting those of said drops which are charged, and catching means for catching those of said drops which are deflected.

7. Apparatus according to claim 6 wherein said print control means comprises means for synchronizing drop generation with the activation of said charging electrodes.

8. Apparatus according to claim 7 wherein said support means rotates at a surface speed such that successively deposited drops in one track have a center-to-center printed dot spacing equal to the center-to-center spacing between adjoining tracks.

9. Apparatus according to claim 4 wherein said rotary support means comprises a cylindrical drum upon which the print receiving sheet is mounted.

* * * * *